July 6, 1965  J. B. DALTON ETAL  3,192,983
TRACTION DEVICE FOR VEHICLE TIRES
Filed April 23, 1964
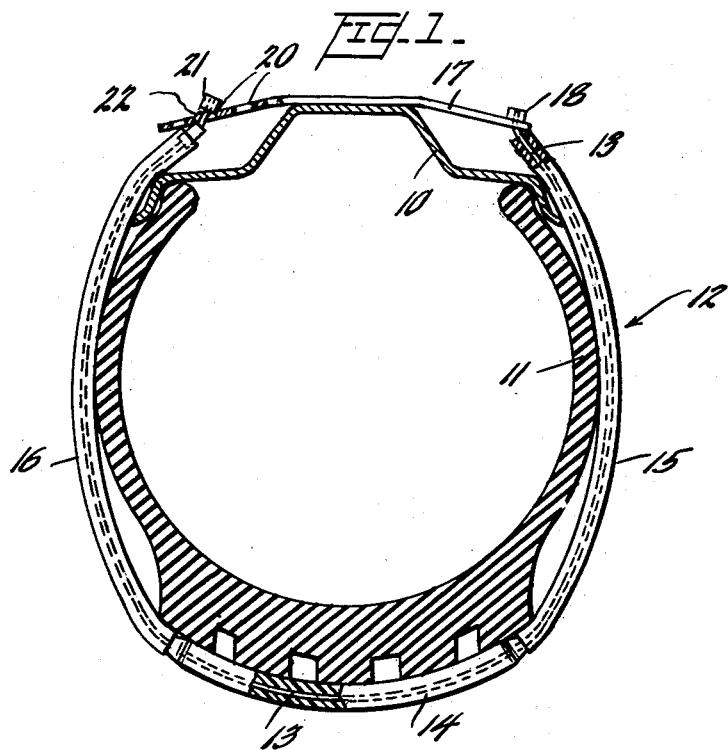
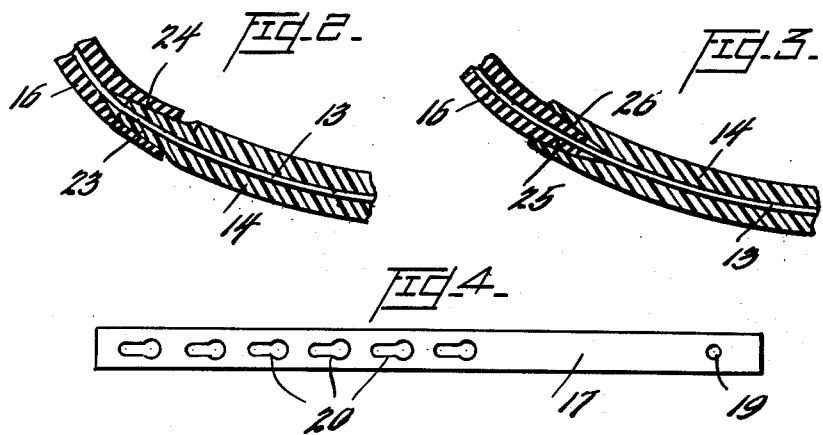
INVENTORS
John B. Dalton
Reginald Elliott
BY Watson, Cole, Grindle & Watson
ATTORNEYS 3,192,983
TRACTION DEVICE FOR VEHICLE TIRES
John Broocks Dalton and Reginald S. Elliott, Warsaw, Ind., assignors to The Dalton Foundries, Incorporated, Warsaw, Ind., a corporation of Indiana
Filed Apr. 23, 1964, Ser. No. 362,032
5 Claims. (Cl. 152—221)

This invention relates to traction devices for vehicle wheels, and more particularly to an improvement upon the conventional tire chains now in common use. As is well known, tire chains of conventional design are characterized by several deficiencies, notable among which are difficulty of installation, particularly in deep snow, and rapid destruction through wear when used upon highways which are partially or entirely bare of snow or ice.

The problem of difficult installation of conventional tire chains, consisting of an assemblage which entirely encircles the vehicle wheel and tire, has been largely reduced through the use of individual cross-chains as a substitute, the individual chains being linked crossways about the tire through the use of individual straps or other fastenings extending between the wheel spokes or through openings provided therefor in the wheel structure. However, such individual cross-chains of metal remain subject to rapid destruction through abrasion, since heavily travelled highways rapidly become bare in spots or in tracks, exposing the chains to direct contact with the concrete or other material of the highway while it is still necessary to use the chains due to the presence of snow or ice on other portions of the highway.

Moreover, tire chains, whether of the allover or individual type, are heavy, noisy, costly, and cause an extremely disagreeable vibration of the vehicle whenever the latter is travelling over ice, hard-packed snow, or other surfaces. Another disadvantage is that when a cross-chain is destroyed through wear, its ends contact the adjacent fender or other parts of the vehicle causing damage and disagreeable noise. All of the foregoing disadvantages are reduced or eliminated by the present invention.

In addition to the general object of the present invention to eliminate the disadvantages mentioned above, it is an object of the invention to provide a traction device for vehicle tires comprising a length of cable, an elongated ground-engaging member threaded on and surrounding the mid-portion of the cable length, which member is of flexible, resilient, tough, abrasion-resistant polyurethane material, tubular shields of rubber-like material covering the cable substantially from its respective ends to the ground-engaging member, and means for interconnecting the respective ends of the cable for securing the device about a tire in a plane substantially radial to the axis of the vehicle wheel, i.e., so that the ground-engaging member extends crossways of the tire tread.

Another object is the provision of such a device in which the tubular shields make a close engagement with the respective ends of the ground-engaging member, so as to avoid exposing any portion of the cable to the elements and, particularly, to the intensive flexing which, otherwise, might occur at the junction of the ground-engaging member and the tubular shields. Such intensive flexing may cause premature breakage of the cable at these points.

Another object is the provision of the device of the character described including quick detachable means for fastening the same about a vehicle tire.

Other and further objects, features and advantages will be apparent from the description which follows, read in connection with the accompanying drawings, in which:

FIGURE 1 is a radial section through a vehicle wheel rim and tire equipped with a traction device of the present invention, portions of the traction device being shown in axial section;

FIGURES 2 and 3 are fragmentary axial sections of the traction device illustrating alternative modes of effecting close engagement between the ground-engaging member and one of the tubular shields; and FIGURE 4 is an elevational view of a suitable quick detachable fastening member.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to FIGURE 1, a conventional wheel rim 10 is provided with a conventional tire 11, the rim and tire being encircled, in a plane radial to the wheel axis, by a traction device 12 according to the present invention. The latter comprises generally a length of cable 13, a ground-engaging member 14 threaded over the cable 13 and surrounding its mid-portion, and tubular shields 15 and 16 preferably of rubber or rubber-like material threaded over and surrounding the cable 13 between its respective ends and the respective ends of the ground-engaging member 14. The cable 13 is permanently secured to a strap 17 of metal or other springy material, for example, by permanently fastening a collar 18 upon an end of the cable 13 after the latter is projected through an aperture 19 (see FIG. 4) in the adjacent end of the strap 17. The strap 17 is provided with a series of spaced keyhole apertures 20 for cooperation with a sleeve 21 having a reduced portion 22, permanently secured upon the other end of the cable 13.

As best seen in FIGURES 2 and 3, the ground-engaging member 14 is closely abutted by the tubular shields 15, 16 to prevent any portion of the cable 13 from being exposed to the weather or to abrasive or corrosive objects or materials present on the highway or other surface upon which the vehicle is moving.

This close engagement of the member 14 and the adjoining shield also reduces or eliminates any concentration of bending motion which might otherwise occur at the point where the cable 13 leaves the ground-engaging member 14, thus preventing premature failure of the cable caused by such excessive bending or flexing. The aforesaid close engagement can be suitably achieved by shaping the ends of the member 14 to provide conical extremities 23 (FIG. 2) and correspondingly recessing the adjacent end of the tubular shield 15, 16, as at 24. Alternatively, the shield may be tapered as at 25 (FIG. 3) and the ends of the member 14 may be correspondingly recessed as at 26. Either arrangement will achieve such a distribution of the aforementioned flexing stresses as to effectively eliminate premature failure of the cable due to such flexing.

From actual tests it has been discovered that a polyurethane plastic material is especially suitable for use in fabricating the ground-engaging member 14, since such material is flexible, resilient, very tough, corrosion-resistant, and has extremely high resistance to abrasion damage. Moreover, it is quiet running and, due to its flexibility and resilience, causes considerably less vibration, in a vehicle equipped with traction devices of the present invention, than if the same vehicle were equipped with the usual chains, either of the overall or individual type. Also, traction devices according to the invention may be inexpensively manufactured, are relatively light in weight, therefore easy to handle and to install, while the quick detachable fastener disclosed facilitates both

Having thus described the invention what is claimed as new and desired to be secured by Letters Patent is:

1. Traction device for vehicle tires, comprising a length of flexible cable, an elongated ground-engaging member having a longitudinal bore threaded on and surrounding the mid-portion of said cable length, the length of said member approximating the width of the tread portion of a vehicle tire, said member being formed of flexible, resilient, tough, abrasion-resistant polyurethane material, tubular shields of rubber-like material covering said cable substantially from its respective ends to said member, each said shield making overlapping engagement with the adjacent end of said member, and means for interconnecting the respective ends of said cable for securing said device about a tire, mounted on a vehicle wheel, in a plane substantially radial to the axis of said wheel.

2. Traction device for vehicle tires, comprising a length of flexible cable, an elongated ground-engaging member having a longitudinal bore threaded on and surrounding the midportion of said cable length, the length of said member approximating the width of the tread portion of a vehicle tire, said member being formed of flexible, resilient, tough, abrasion-resistant polyurethane material, tubular shields of rubber-like material closely abutting the respective ends of said member and covering said cable substantially from its respective ends to said member, and means for interconnecting the respective ends of said cable for securing said device about a tire, mounted on a vehicle wheel, in a plane substantially radial to the axis of said wheel, said member making a tapered joint with each of said shields.

3. The device defined in claim 2, the respective ends of said member being shaped to provide substantially conical extremities, and the adjacent ends of said shields being correspondingly recessed.

4. The device defined in claim 2, the proximal ends of said shields being shaped to provide substantially conical extremities and the respective ends of said member being correspondingly recessed.

5. Traction device for vehicle tires, comprising a length of flexible cable, an elongated ground-engaging member having a longitudinal bore threaded on and surrounding the midportion of said cable length, the length of said member approximating the width of the tread portion of a vehicle tire, said member being formed of flexible, resilient, tough, abrasion-resistant polyurethane material, tubular shields of rubber-like material covering said cable substantially from its respective ends to said member, each said shield making overlapping engagement with the adjacent end of said member, and means for interconnecting the respective ends of said cable for securing said device about a tire, mounted on a vehicle wheel, in a plane substantially radial to the axis of said wheel, said last means comprising a strip of springy material permanently attached to one end of said cable length and provided with a plurality of spaced keyhole apertures, the other end of said cable being permanently provided with a member shaped and dimensioned to extend partly through and be locked in one of said apertures.

References Cited by the Examiner

UNITED STATES PATENTS

| | | | |
|---|---|---|---|
| 1,297,155 | 3/19 | Harrington | 152—221 |
| 2,771,929 | 11/56 | Alterio et al. | 152—222 |
| 2,902,072 | 9/59 | Reuter. | |

ARTHUR L. LA POINT, *Primary Examiner.*